United States Patent [19]

Mitchell et al.

[11] Patent Number: 5,305,180
[45] Date of Patent: Apr. 19, 1994

[54] DISK DRIVE EJECTOR MECHANISM WITH LATCH AND EJECTOR AND STANDBY SWITCH

[75] Inventors: Dennis R. Mitchell, San Jose; Steve D. Friend, Cupertino, both of Calif.

[73] Assignee: GRiD Systems Corporation, Fremont, Calif.

[21] Appl. No.: 711,523

[22] Filed: Jun. 6, 1991

[51] Int. Cl.⁵ .............. H05K 7/14; H01R 13/639; G06F 1/00
[52] U.S. Cl. .............. 361/685; 439/159; 439/924; 364/707; 361/725; 361/728
[58] Field of Search .............. 364/707, 708; 360/97.01, 137; 439/159, 160, 186, 924; 292/24, 25, 30; 361/212, 220, 380, 390, 391, 392, 395, 399, 415

[56] References Cited

U.S. PATENT DOCUMENTS

| | | |
|---|---|---|
| 2,609,268 | 9/1952 | Nye .............. 439/160 X |
| 3,144,957 | 8/1964 | Anderson .............. 292/25 X |
| 4,144,580 | 3/1979 | Seki et al. .............. 364/707 |
| 4,466,680 | 8/1984 | Sakai et al. .............. 439/159 |
| 4,597,173 | 7/1986 | Chino et al. .............. 439/160 X |
| 4,639,863 | 1/1987 | Harrison et al. . |
| 4,688,131 | 8/1987 | Noda et al. .............. 360/137 |
| 4,754,397 | 6/1988 | Varaiya et al. .............. 360/97.01 X |
| 4,819,153 | 4/1989 | Graham et al. . |
| 4,825,321 | 4/1989 | Hassel et al. . |
| 4,833,554 | 5/1989 | Dalziel et al. . |
| 4,849,944 | 7/1989 | Matsushita .............. 439/924 X |
| 4,858,034 | 8/1989 | Hassel et al. . |
| 4,860,194 | 8/1989 | Harrison et al. . |
| 4,887,188 | 12/1989 | Yoshida et al. .............. 361/415 X |
| 4,889,495 | 12/1989 | Kimura .............. 439/924 X |
| 4,893,210 | 1/1990 | Mintzlaff .............. 364/708 X |
| 4,941,841 | 7/1990 | Darden et al. .............. 364/708 X |
| 4,955,817 | 9/1990 | Sugai .............. 439/924 X |
| 4,967,311 | 10/1990 | Ferchau et al. .............. 361/395 |
| 4,982,303 | 1/1991 | Krenz .............. 360/137 |
| 5,008,846 | 4/1991 | Inoue .............. 364/707 |
| 5,021,983 | 6/1991 | Nguyen et al. .............. 364/707 |
| 5,041,924 | 8/1991 | Blackborow et al. .............. 364/708 X |
| 5,051,101 | 9/1991 | Komatsu .............. 439/159 |

FOREIGN PATENT DOCUMENTS

| | | |
|---|---|---|
| 3419781 | 11/1985 | Fed. Rep. of Germany ...... 439/160 |
| 2594997 | 8/1987 | France .............. 360/137 |
| 738203 | 6/1980 | U.S.S.R. .............. 439/160 |

OTHER PUBLICATIONS

IBM Technical Disclosure Bulletin, vol. 29, No. 12, May, 1987, pp. 5292 and 5293, "Grounded File-Mounting Plate".

Primary Examiner—Leo P. Picard
Assistant Examiner—Michael W. Phillips
Attorney, Agent, or Firm—Townsend & Townsend

[57] ABSTRACT

A portable computer having a standby power mode of operation has a bay for receiving a portable removable disk drive. The drive has a pair of slots engageable with parallel guide rails in the receiver, and a notch engageable with a retractable latch normally biased in the direction of the notch. A switch adjacent one of the rails generates a standby signal for the computer whenever the drive is inserted into the bay or moved in the ejection direction after installation. An ejector mechanism retracts the latch and an auxiliary locking pivot to release the drive for removal. The ejector also provides an ejection force which moves the drive a sufficient distance externally of the bay to permit the drive to be grasped by the user for complete removal. A grounding contact engageable with a similar contact on the drive provides a static discharge path for the drive prior to electrical interconnection with the computer.

20 Claims, 7 Drawing Sheets

DISK DRIVE EJECTOR MECHANISM WITH LATCH AND EJECTOR AND STANDBY SWITCH

BACKGROUND OF THE INVENTION

This invention relates to the field of portable computers, and in particular to portable computers employing disk drives.

Portable computers are known which incorporate disk drives used for mass storage of data used by the computer for processing. In the past, such disk drives have been incorporated into the housing of the personal computer as a permanent structural component and thus not removable. Some of the disk drives are designed for use with so-called floppy disks, while others are designed for use with rigid disks. The floppy disks are insertable and removable from the drives; while the rigid disks are not usually fixed within the drive.

The advantage of the floppy disk is its portability: i.e., data stored on the floppy disk can be removed from the drive (and thus the computer) and either physically stored elsewhere or transferred into the internal or mass storage memory of some other computer. Rigid disk drives incorporated into the physical structure of the portable computer housing do not offer this portability advantage.

In order to try to provide some portability to disk drives using rigid disks, portable drives have been designed which are removably connectable to the computer system incorporated inside the portable computer housing, the connection usually being made by a cable. In addition, rigid disk drives have been designed which are incorporated onto printed circuit cards which are removably attachable in the extra bus slots within a personal computer. Due to size requirements, however, such arrangements have not been found to be physically compatible with the extremely small portable computers which are currently available.

As portable computers have evolved into more sophisticated computer systems with smaller dimensions and lighter weight, efforts have been directed toward providing increasing amounts of portable data storage with smaller weight and physical dimensions. With reduced physical size, however, it has been found difficult if not impossible to provide appropriate and reliable mechanical latching mechanisms which provide reliable mechanical retaining forces when the disk drive is installed in the portable computer while at the same time affording easy removal of the disk drive. For example, with space at an extreme premium there is little room available for mechanical latching mechanisms ordinarily used to retain a rectangular module in an opening formed in a housing. In addition to these mechanical constraints, portable computers operate on battery power which has limited electrical storage capacity. Consequently, normal power operated latching and unlatching mechanisms are not suitable for adaptation into a portable computer environment. Also, the electronic components of a computer system incorporated into a portable computer are sensitive to static charges: consequently, some protective mechanism must be provided to guard against static discharge into the computer system electronic components when an object is inserted into a portable computer housing and electrically connected to the computer system components. In addition, to ensure proper system operation, some provision must be made to signal the computer that electrical interconnection or disconnection between the disk drive and the computer is imminent.

SUMMARY OF THE INVENTION

The invention comprises a removable disk drive receiver mechanism incorporated into the housing of a portable computer which provides a positive and reliable mechanical latching mechanism and release therefor; which generates a standby signal upon insertion or removal of a disk drive therefrom in order to signal the computer of one impending connection or disconnection; and which electrically grounds the disk drive prior to electrical connection between the disk drive and the computer to protect the computer system from static discharge.

In the broadest aspect, the invention comprises an improvement in a portable computer having a standby power mode of operation and a receiver for a removable disk drive electrically connectable to the computer, the improvement including means responsive to motion of a drive in the receiver in the insertion direction or in the removal direction for generating a standby power mode initiation signal so that the computer operates in the standby power mode prior to the electrical connection of the drive to the computer and prior to the electrical disconnection of the drive from the computer. The portable computer and the disk drive are provided with complementary interface connectors, and the invention further includes a grounding circuit electrically coupled to the computer and engageable with an associated electrical grounding means carried by the disk drive for providing a static discharge path from the drive via the grounding means prior to electrical connection between the drive and the computer by means of the complementary interface connectors. The signal generating means includes an electromechanical switch engageable with the disk drive during insertion or removal.

From a more specific standpoint, the invention comprises a removable disk drive receiver in a portable computer, the receiver including guide means for supporting a removable disk drive, latch means for retaining a removable disk drive after insertion of the drive into the guide means, ejector means for retracting the latch means to enable removal of the disk drive from the guide means, and switch means coupled to the latch means for generating a standby signal in response to the insertion of a removable disk drive into the guide means and the retraction of the latch means by the ejector means so that the portable computer can assume a standby mode in response to the standby signal. The guide means preferably includes a pair of laterally spaced parallel rails, each rail dimensioned to slidably receive a grooved wall portion of the disk drive.

The latch means includes a latch member having a nose portion engageable with a latching edge formed in the disk drive and a bearing portion, and a biasing member coupled to the bearing portion for urging the latch member in a latching direction so that the nose of the latch member is biased against the disk drive latching edge when the drive is installed in the computer.

The ejector means includes a shaft rotatably mounted adjacent the guide means, the latch means and the switch means; and a latch retracting member coupled to the shaft and engageable with the latch means when the shaft is rotated to a predetermined unlatched position to disengage the latch means from the disk drive, thereby enabling removal of the drive from the computer. The shaft is reciprocably mounted for bi-directional movement along the longitudinal axis thereof, and the ejector means also includes means for biasing the shaft in one axial direction, preferably outwardly of the computer. The ejector means further includes angular bias means for biasing the shaft in a predetermined angular direction, and releasable catch means for preventing rotational movement of the shaft in the predetermined angular direction after the shaft has been rotated in the opposite direction by a predetermined amount. The releasable catch means includes a catch member coupled to the shaft and having a catch pawl extending radially outwardly of the shaft axis, and a cogging member positioned adjacent the catch member in an interferring location so that the catch pawl engages the cogging member upon rotation of the shaft in the opposite direction by the predetermined amount. The cogging member is positioned adjacent the catch member for limited movement in directions perpendicular and parallel to the shaft.

The invention further includes means for preventing movement of the shaft in the axial direction opposite the one axial direction when the shaft is angularly located in a position different from the unlatched position, the movement preventing means including an abutment edge engageable with the latch retracting member.

The ejector further includes means for applying an ejection force to the drive when the shaft is translated along the axis thereof inwardly of the computer. The ejector force applying means includes a pivotable member having a first portion engageable with the shaft and a second portion engageable with the drive, the first and second engageable portions being preferably positioned on opposite sides of the pivot axis of the pivotable member.

The invention further includes releasable locking means for additionally retaining the drive in the computer, the releasable locking means including a pivotable member having a locking portion engageable with a lock edge formed in the drive, means for biasing the locking portion in the direction of the lock edge in the drive, and means for enabling the locking portion to be retracted from the lock edge of the drive to enable removal thereof.

The invention further includes connector means for enabling electrical interconnection between the computer and the drive when received in the guide means, and electrical grounding means engageable with an associated electrical grounding means carried by the drive for enabling static electrical discharge of the drive upon insertion into the computer and before electrical connection occurs between the drive and the computer.

The invention is compactly arranged to fit within the limited space available in the housing of current portable computers, while at the same time providing positive latching action and locking action for the removable disk drive, as well as a positive ejection force which translates enough of the disk drive out of the receiver bay formed in the computer housing that the user can conveniently grasp the disk drive and manually remove it from the computer housing. The invention also enables the computer to be placed in a standby mode before electrical connection or disconnection occurs between the disk drive and the computer system, and also provides a safe electrical grounding path for discharging static electricity from the drive to ground prior to electrical interconnection between the drive and the computer system.

For a fuller understanding of the nature and advantages of the invention, reference should be had to the ensuing detailed description taken in connection with the accompanying drawings.

DESCRIPTION OF THE PREFERRED EMBODIMENTS

Figure 1:
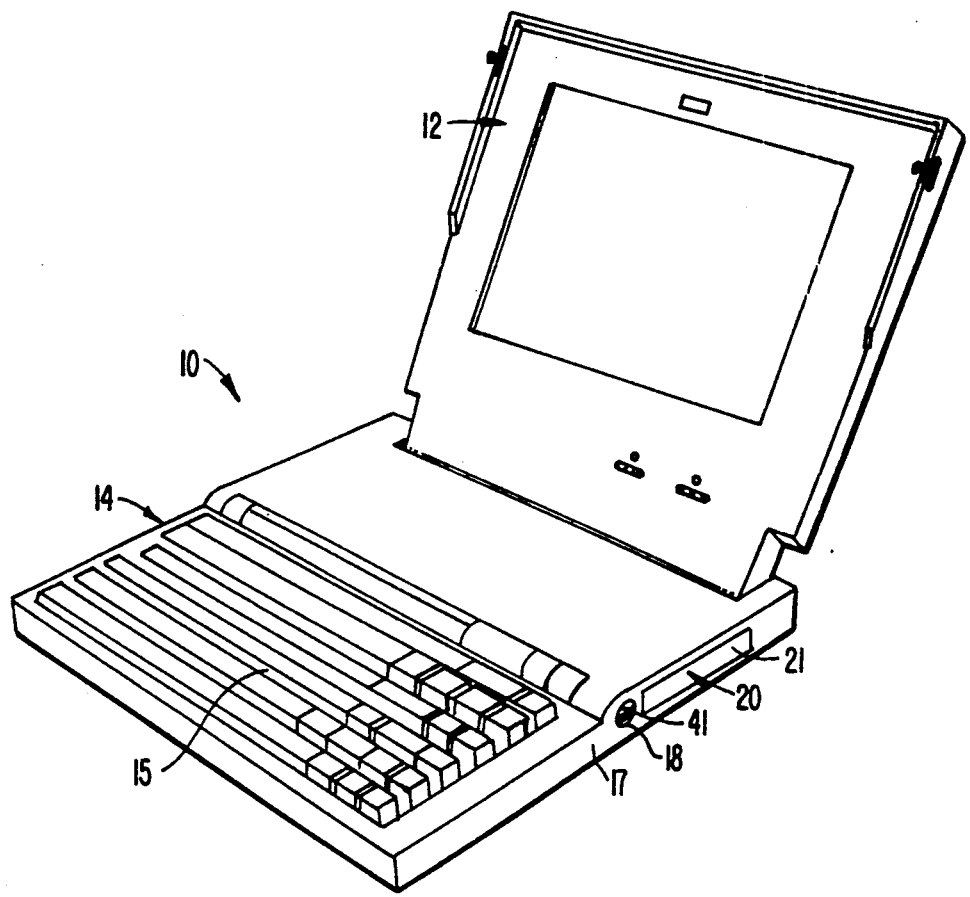
FIG. 1 is a perspective view of a portable computer incorporating the invention.

Turning now to the drawings, FIG. 1 shows a portable computer incorporating the invention. As seen in this FIG., a computer 10 has a lid 12 shown in the open position and a base housing 14 with the usual keyboard 15. Installed within the computer 10 is a removable disk drive 20 having an outer end wall 21 which is flush with the right side wall 17 of computer 10. Mounted within a recess 18 of side wall 17 is a knob 41 which is both rotatable and translatable inwardly of base housing 14 in the manner described below to enable the removable disk drive 20 to be partially ejected from the portable computer 10.

Figure 2:
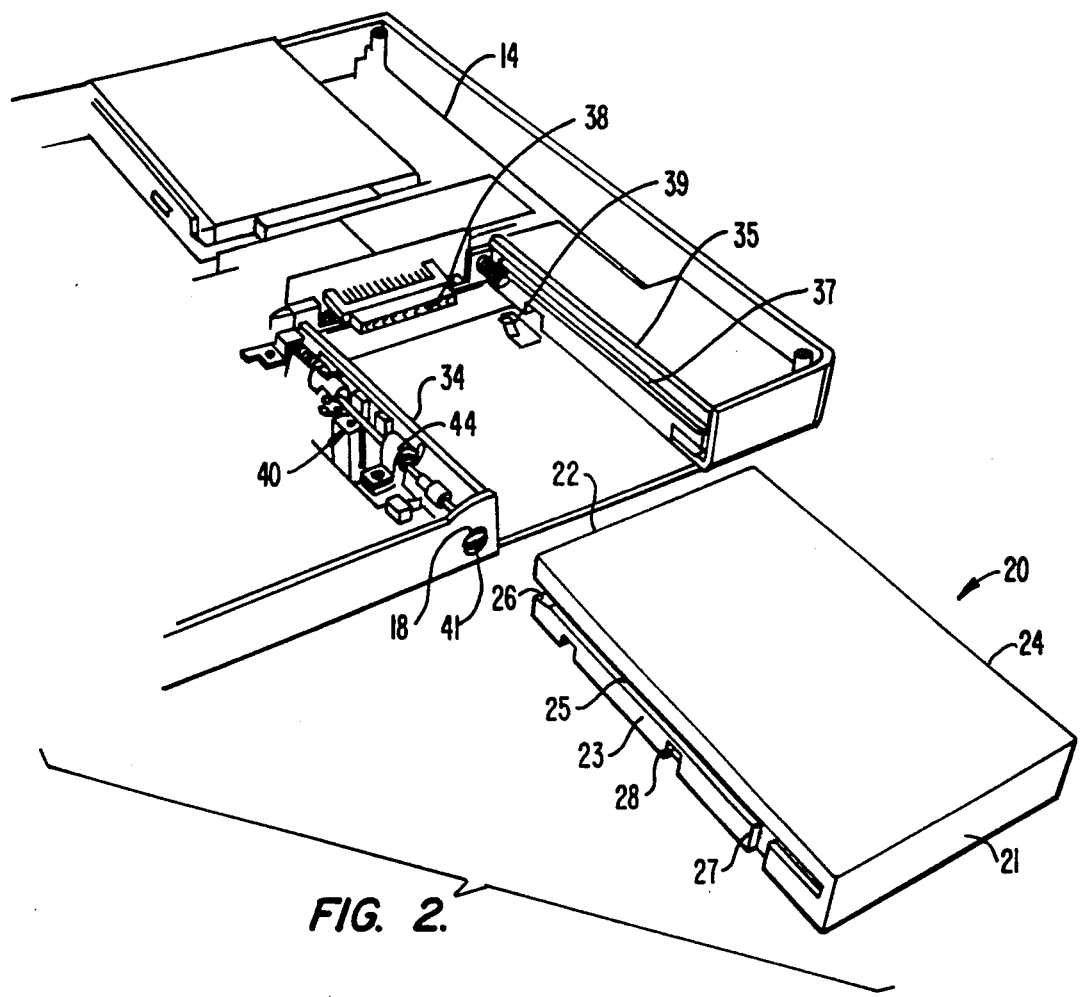
FIG. 2 is a partial perspective view showing the main portion of the disk drive receiver bay and associated components with the disk drive removed.

With reference to FIG. 2, removable disk drive 20 is seen to be generally rectangular in shape having an inner end wall 22, left side wall 23 and right side wall 24. The housing of drive 20 may be fabricated from any suitable durable material, such as metal or plastic. The left side wall 23 of disk drive 20 is provided with a longitudinally extending groove 25 with a flared inner end 26, a first notch with a latching edge 27 and a second notch with a locking edge 28. Although not illustrated expressly in FIGS. 2 and 3, the right side wall 24 of the housing for disk drive 20 is provided with an identical groove 25. The grooves 25 cooperate with a pair of rails to be described, which provide sliding support for the portable disk drive 20. Latching edge 27 and locking edge 28 cooperate with latching and locking mechanisms to retain the disk drive within the personal computer receiver bay in the manner described below.

Figure 3:
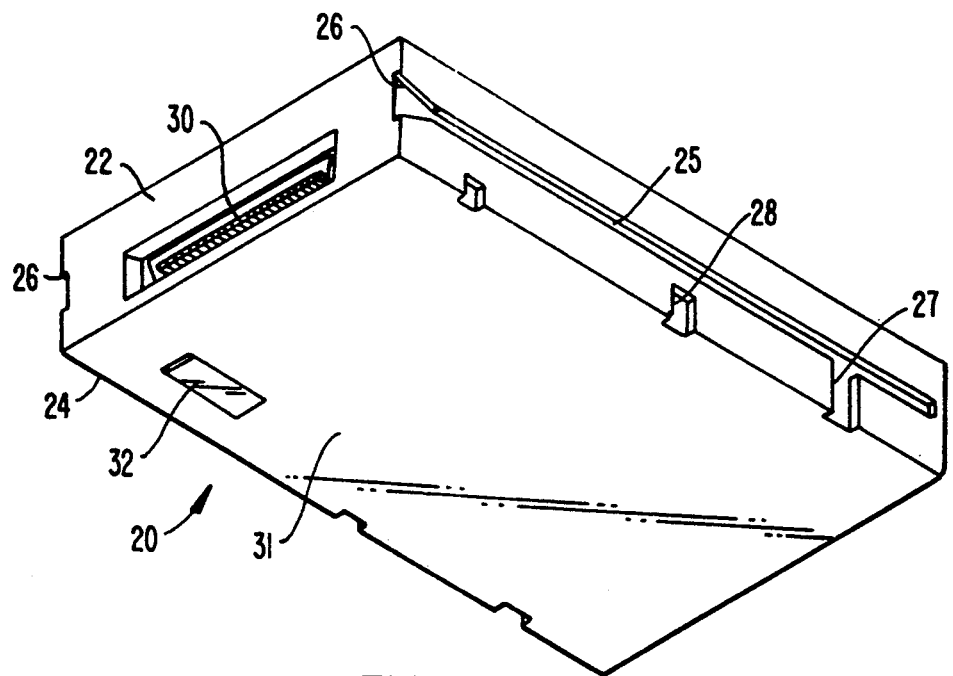
FIG. 3 is a perspective view of the disk drive illustrating the grounding connector, mechanical guides and electrical interconnection mechanism.

As shown in FIG. 3, disk drive 20 has an electrical connector 30 installed in the inner end wall 22, the connector 30 being adapted to mate with an electrical socket mounted in the computer as described below. Located on the bottom wall 31 of disk drive 20 is an electrically conductive grounding contact 32 adapted to mate with a grounding contact described below.

Figure 4:
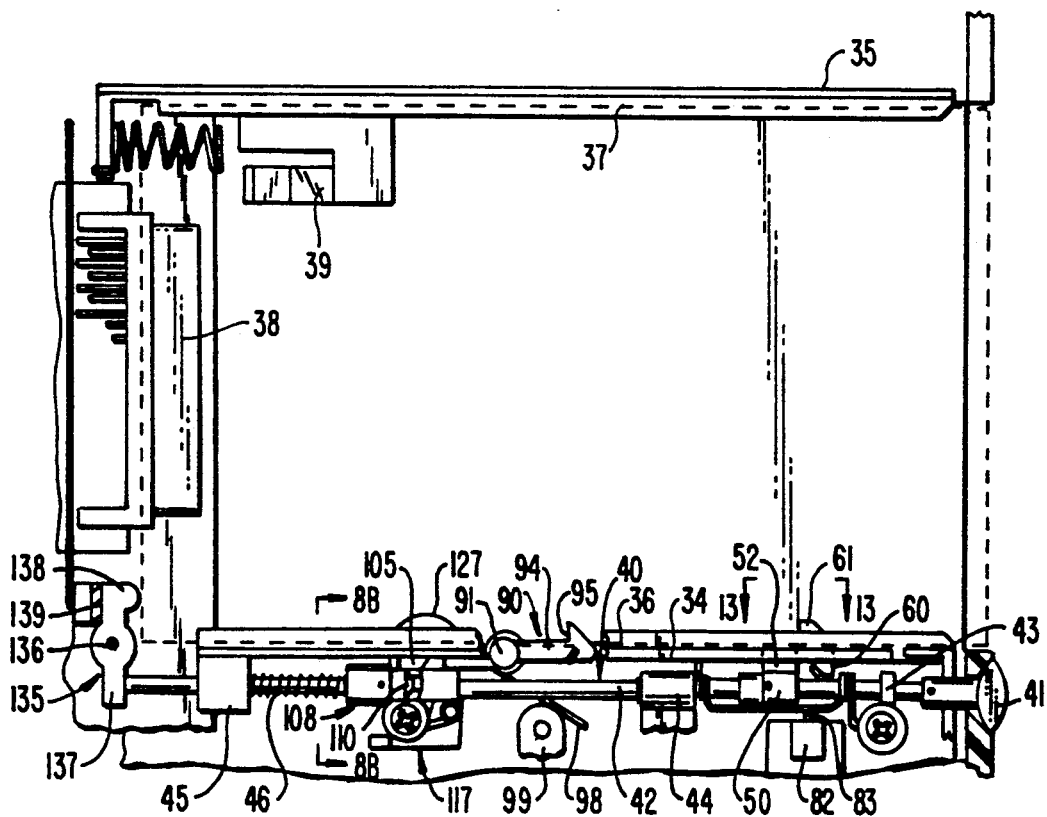
FIG. 4 is a partial top plan view showing the receiver bay with one of the guide rails partially broken away.

As best shown in FIGS. 2 and 4, a disk drive receiver bay is provided in the base housing 14 of the portable computer 10 and includes a pair of vertical side walls 34, 35 having facing rails 36, 37. Rails 36, 37 are so dimensioned and arranged as to mate with grooves 25 formed in the side walls 23, 24 of removable disk drive 20 and co-act to provide support for the drive 20 when installed in the portable computer. Positioned adjacent the inner end of the disk drive receiver bay is an electrical connection socket 38 which mates with plug connector 30 mounted in inner end wall 22 of disk drive 20. A spring contact 39 is mounted as shown in FIGS. 2 and 4 in such a position as to engage grounding contact 32 located on the bottom surface 31 of disk drive 20. The relative positioning of socket 38 and spring contact 39 is such that spring contact 39 makes sliding engagement with grounding contact 32 in the disk drive 20 prior to electrical interconnection between plug 30 and socket 38 during insertion of the drive 20 into the portable computer housing 14. In this way, the disk drive 20 is grounded before electrical interconnection between the components within the drive 20 and the computer system located in housing 14, which provides static charge protection for the computer system.

Mounted adjacent wall 34 is a compound mechanism generally designed with reference numeral 40 (see FIGS. 2 and 4) which provides mechanical latching, locking and ejecting for disk drive 20. Central to the compound mechanism 40 is a shaft 42 which is mounted in three journals 43–45 for both rotational and translational movement with respect to the axis of shaft 42. Manual rotation of the shaft 42 is afforded by knob 41 which is configured to be grasped between the thumb and forefinger of the user. Knob 41 also facilitates manual translation of shaft 42 inwardly of the computer to release the disk drive 20 for withdrawal in the manner described below. Shaft 42 is biased both axially outwardly of computer 10 and angularly counter clockwise (as viewed in FIG. 2) by a single spring 46 which is secured at one end to journal 45 and at the other end to shaft 42.

Figure 13:
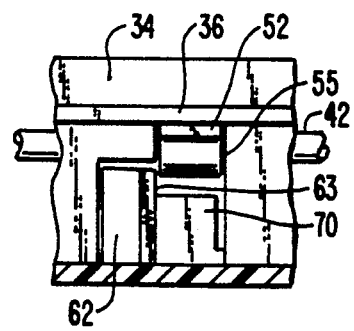
FIG. 13 is a partial side view showing the latch member and the latch retracting member.
Figure 11:
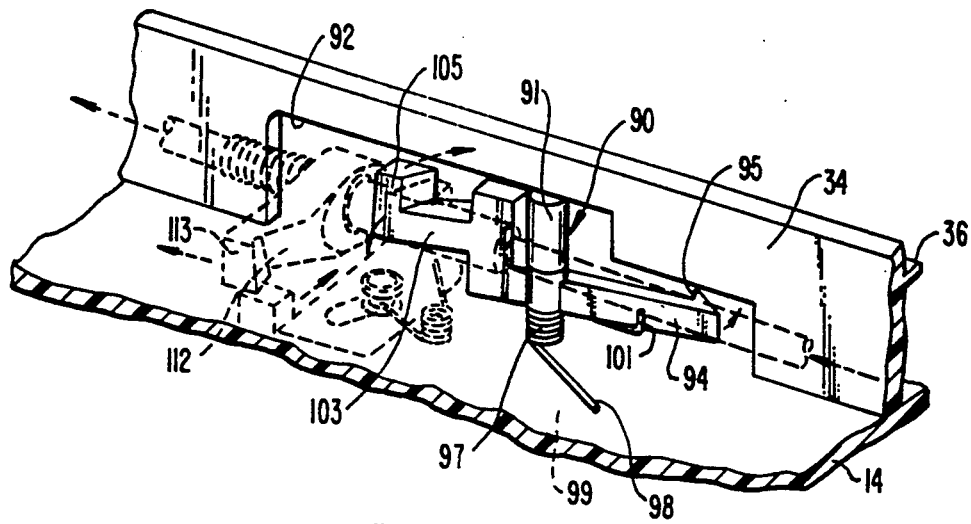
FIG. 11 is an enlarged partial perspective view illustrating the disk drive locking and mechanism.

Secured to shaft 42 between journals 43 and 44 is a latch retracting member 50. Member 50 includes a beak portion 52 (see FIGS. 7B and 13) which is laterally offset from the axis of shaft 42 by a sufficient distance to engage an abutment edge 55 formed in side wall 34 when the shaft 42 is in the home position illustrated in FIGS. 4, 7B and 13. In this home position, the engagement between back portion 52 and abutment edge 55 prevents axial translation of shaft 42 inwardly of the computer base housing 14 when manual force is applied to knob 41.

Figure 12:
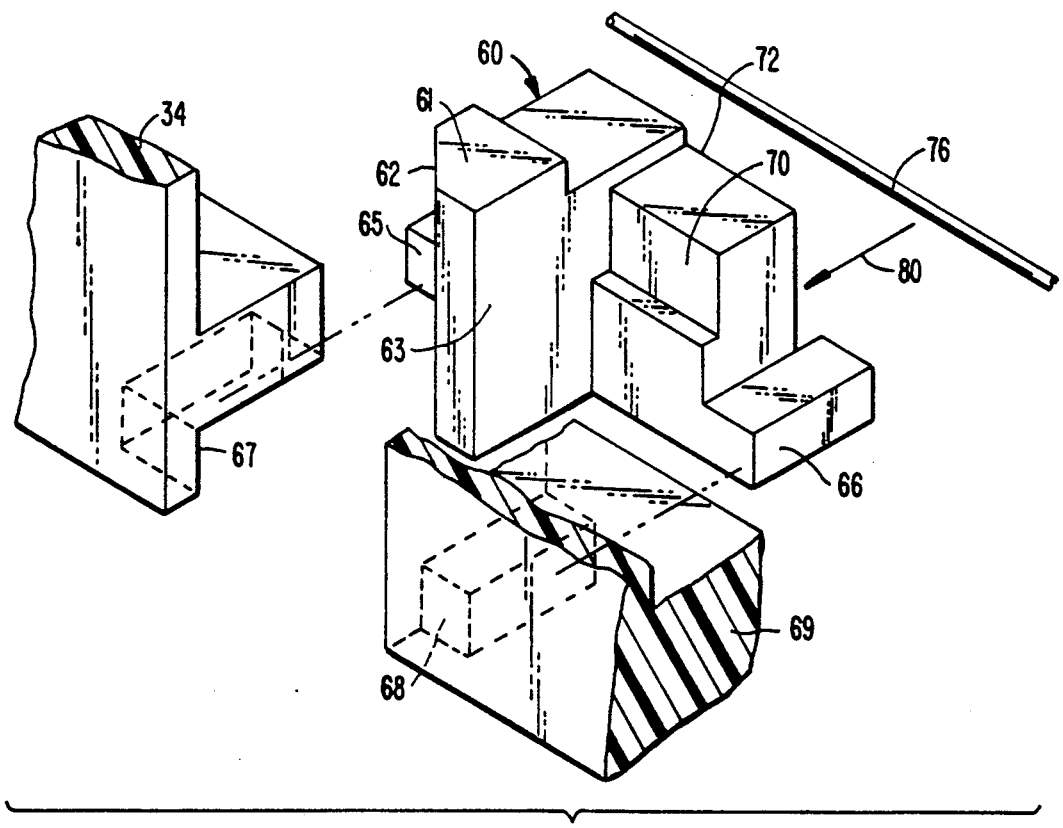
FIG. 12 is a perspective view partially broken away illustrating the sliding latch member.

Slidably mounted below latch retracting member 50 is a latch member 60 (FIGS. 4, 7A, 7B, 12 and 13). As best seen in FIG. 12, latch member 60 includes a nose portion 61 with an angled surface 62 and an abutment edge 63 which is engageable with latching edge 27 on disk drive 20. A pair of flanking base guide portions 65, 66 are dimensioned to be slidingly accommodated by a pair of relieved shoulder portions 67, 68 formed in the base 69 of wall 34. Latch member 60 further includes an engagement surface 70 which is engageable with beak portion 52 of latch retracting member 50 when shaft 42 is rotated clockwise from the home position.

Figure 10:
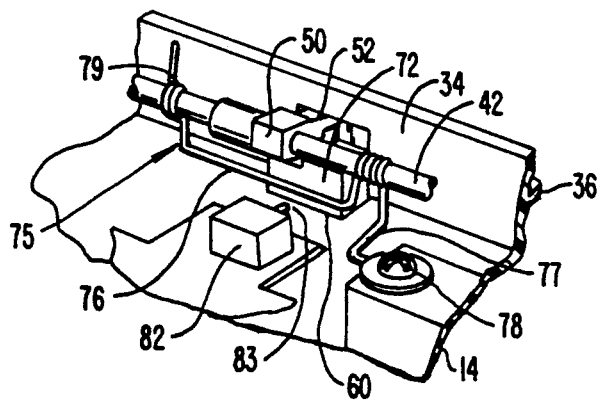
FIG. 10 is a partial perspective view showing a portion of the latching and ejector mechanisms.

Latch member 60 also has a bearing surface 72 to which a biasing force is applied by means of a bias spring 75. As best shown in FIGS. 4 and 10, bias spring 75 includes a central bar portion 76 which bears against the bearing surface 72 of latching member 60, a first end 77 anchored to computer housing 14 by means of a fastener 78 and a second end 79 which is pinned to shaft 42. Bias spring 75 is tensioned to provide a biasing force against bearing surface 72 tending to force the latching member 60 in the direction of arrow 80 (FIG. 12) so that the nose portion 61 of latching member 60 protrudes through an aperture in wall 34 (see FIGS. 4, 7B and 13).

Mounted on computer housing 14 adjacent bearing surface 72 of latching member 60 is a small switch 82 (FIGS. 4, 7A, 7B and 10) having a switch activating arm 83. In the home position illustrated in FIG. 7B, the activating arm 83 is biased outwardly by a mechanism (not shown) internal to switch 82 to place the switch 82 in a first state. When the latch member 60 is retracted by the beak portion 52 of latch retracting member 50 (see FIG. 7A), the bearing surface 72 of latch member 60 forces arm 83 inwardly of switch 82 to the alternate switch state. Whenever switch 82 is placed in this alternate state, an electrical standby signal is generated for the computer 10. As will be described more fully below, this happens once during insertion of the disk drive 20 into the computer housing and once during removal of the disk drive 20 from the computer housing.

Positioned rearwardly of central shaft journal 44 is a disk drive locking mechanism best shown in FIGS. 4, 6A, 8A, 8B, 9 and 11. The locking mechanism includes a pivotable locking member 90 which is pivotally mounted to the computer base housing 14 about the central portion 91 within an opening 92 formed in wall 34. A first arm 94 extends generally in the outward direction of the computer base housing 14 and terminates in a notch end having a locking edge 95. Locking edge 95 is engageable with locking edge 28 formed in disk drive 20 when the drive is fully installed. A bias spring 97 has a first fixed end 98 engaged with an abutment 99 formed in base housing 14, and a second end 101 which applies a biasing force to the forward arm 94 of pivotable member 90 tending to rotate member 90 in the counter clockwise direction as viewed in FIG. 4. The other arm portion 103 of pivotable member 90 terminates in a bearing surface 105 which abuts against the outer surface of a compound catch member 108 (FIG. 4), which is secured to shaft 42. Catch member 108 is provided with an outwardly extending angled tooth 110 (FIG. 6A) which engages surface 105 of pivotable member 90 when the shaft 42 is forced inwardly by pressure on knob 41 (see FIG. 6B). Thus, when the shaft 42 is forced inwardly, the pivotable locking member 90 is rotated in the clockwise direction as viewed in FIGS. 4, 6A and 6B to release the locking edge 95 from the locking edge 28 in the disk drive 20. This releases and overcomes the biasing force afforded by spring 97 to the forward arm 94 of pivotable member 90.

Figure 8A:
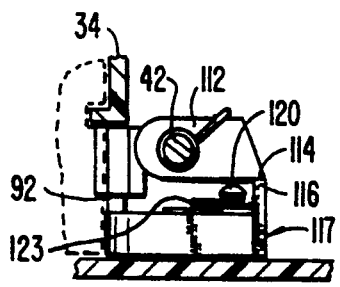
FIGS. 8A-8B are sectional views taken along line 8A—8A of FIG. 6A also further illustrating the unlatching operation.
Figure 8B:
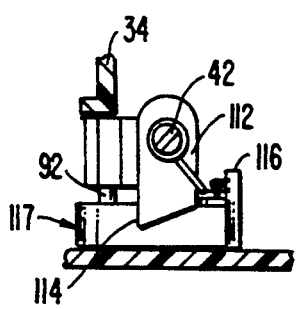
Figure 9:
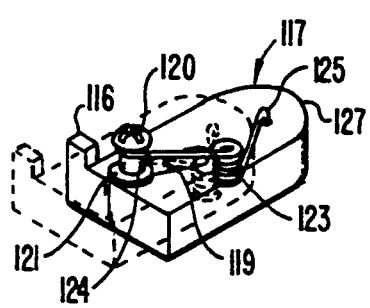
FIG. 9 is a perspective view of the cogging member.

Catch member 108 includes a laterally extending catch pawl 112 terminating in an end having an abutment edge 114 (see FIGS. 8A and 8B). Abutment edge 114 is arranged to engage a confronting abutment edge 116 formed on a cogging member 117. As best seen in FIGS. 8A, 8B and 9, cogging member 117 has a diagonally formed slot 119 which defines the direction and extent of sliding motion permitted to cogging member 117. Cogging member 117 is captured by means of a suitable fastener 120 having a guide collar 121, and cogging member 117 is normally biased to the position illustrated in FIG. 9 by means of a bias spring 123 having a first end 124 bearing against the fastener 120 and a second end 125 secured in a suitable aperture in cogging member 117. It should be noted that the width of slot 119 is wider than the hidden shaft portion of fastener 120 to provide some mechanical tolerance therebetween.

Figure 5A:
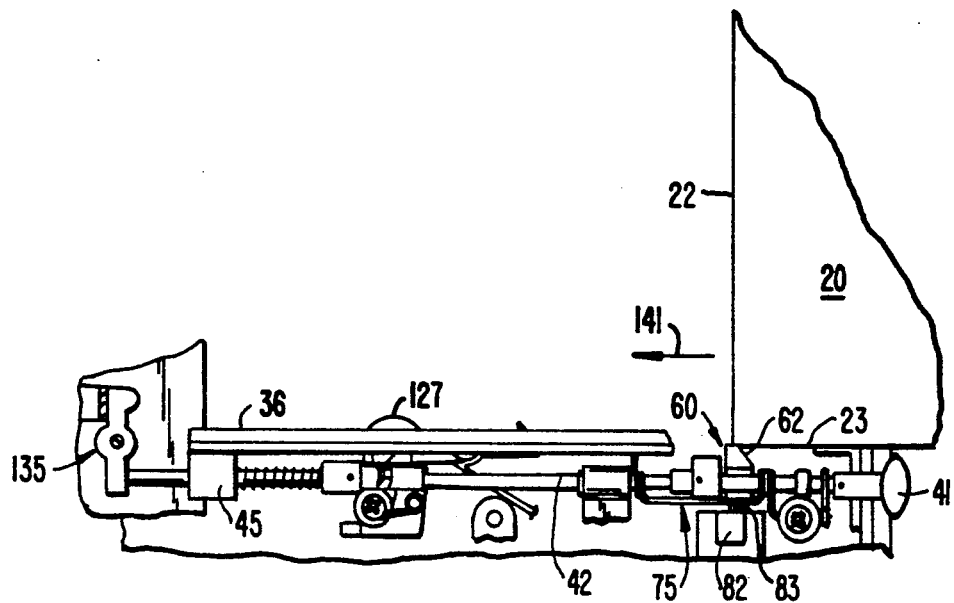
FIGS. 5A-5C are sequential enlarged partial top plan views illustrating insertion of the drive into the receiver bay and the latching operation.
Figure 5B:
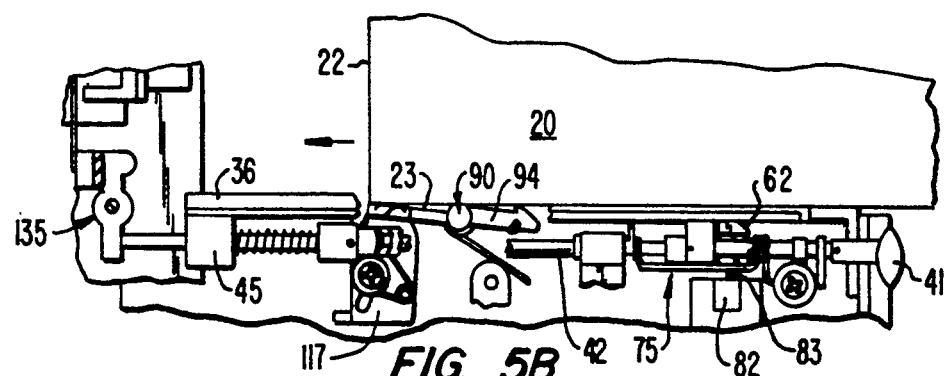

Cogging member 117 has a rounded end with a bearing surface 127 which is engageable by the confronting side wall 23 of disk drive 20 (see FIGS. 5A and 5B), so that cogging member 117 has two extreme positions: a first position illustrated in FIGS. 4, 5A and 9 in which the rounded bearing surface 123 extends through the aperture 92 in wall 34 (FIG. 5A) and one in which the cogging member is retracted to the position illustrated in FIG. 5B. In this latter position, the engagement surface 116 of cogging member 117 is positioned to confront the abutment edge 114 of catch member 108 (see FIG. 8A) when the shaft 42 is rotated to the drive ejection position.

Figure 6A:
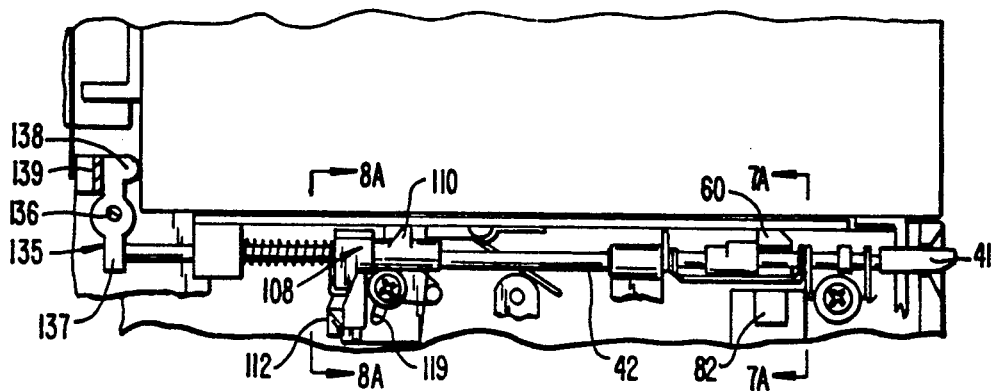
FIGS. 6A-6B are views similar to FIGS. 5A-5C illustrating the unlatching operation.
Figure 6B:
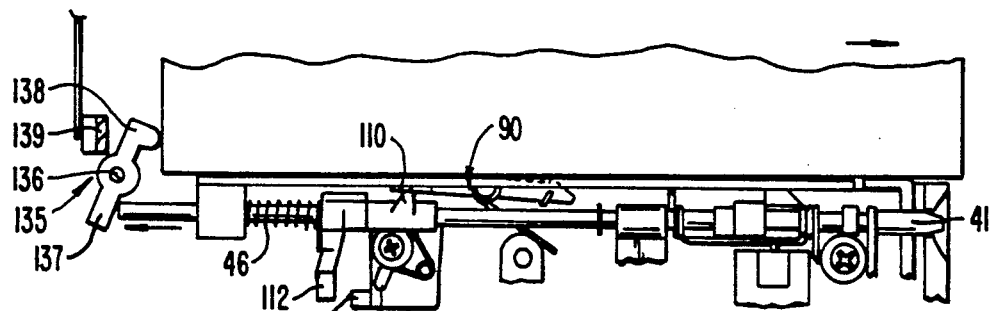

Positioned adjacent the inner end of shaft 42 is a pivotable member 135 (see FIGS. 4, 6A and 6B). Member 135 is mounted centrally on a pivot post 136 which is fixed to the computer base housing 14 and includes a first end 137 engageable with the inner end of shaft 42 and a second end 138 engageable with the inner end wall 22 of disk drive 20. A resilient stop 139 is provided to limit motion of member 135 in the counter clockwise direction. Member 135 is arranged such that inward motion of shaft 42 causes the member 135 to pivot about post 136 and apply a mechanical force to inner wall 22 of disk drive 20 via end 138. This force results in a partial ejection of the disk drive from the computer base housing.

Figure 5C:
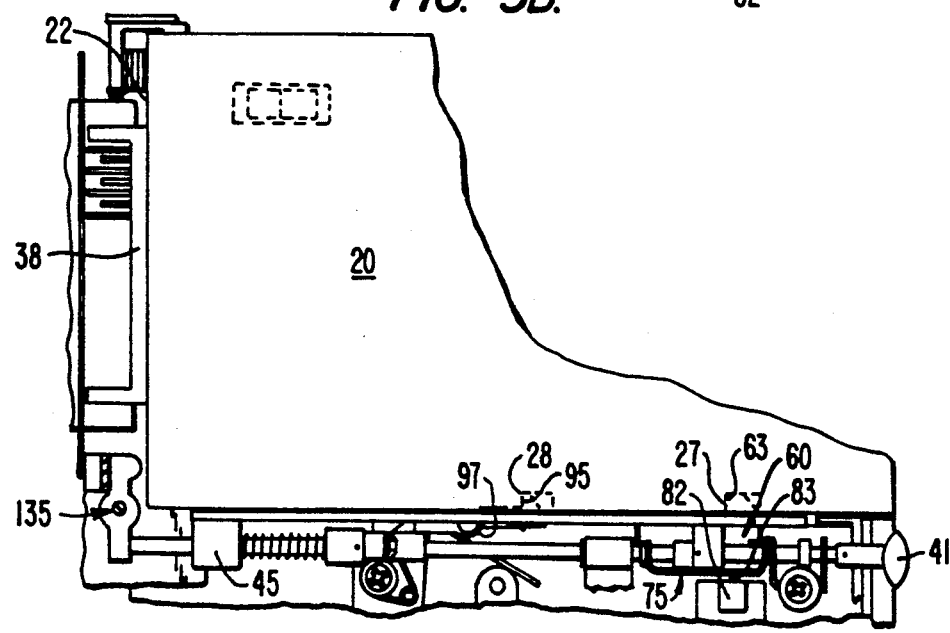

The operation of the invention will now be described. FIGS. 5A-5C are sequential partial top plan views illustrating the process of inserting a disk drive 20 into the computer base housing 14. Drive 20 is manually inserted into the computer base housing 14 receiver bay by manipulating grooves 25 onto rails 36, 37. In this initial maneuvering process, the flared entrance 26 facilitates locating the forward portion of the grooves 25 onto the rails 36, 37. As the drive 20 is manipulated inwardly of the computer base housing 14, the forward edge of drive 20 (i.e., the intersection of the inner wall 22 and the left side wall 23) encounters the angled surface 62 of the latch member 60, and continued inward motion of drive 20 in the direction of arrow 141 causes the latch member 60 to be forced toward switch 82 against the biasing force provided by spring 75 (FIG. 5A). As a result, switch 82 is driven to the alternate activated state to generate the standby signal for the computer system.

Continued motion of drive 20 in the direction of arrow 141 results in the deflection of the tip of arm 94 of pivotable locking member 90 and cogging member 117 inwardly of wall 34. After engagement of the disk drive borne grounding contact 32 with stationary grounding contact 39 (FIGS. 3 and 4), plug connector 30 mates with connection socket 38, latch member 60 is biased outwardly under the action of spring 75 until abutment edge 63 of latch member 60 is engaged with latching edge 27 on disk drive 20, and arm 94 is biased in the counter clockwise direction under the action of spring 97 until locking edge 95 is engaged with locking edge 28 of the disk drive 20. It should be noted that, when latch member 60 is driven away from switch 82, the switch is restored to its initial switch state. The fully installed position is illustrated partially in FIG. 5C.

Figure 7A:
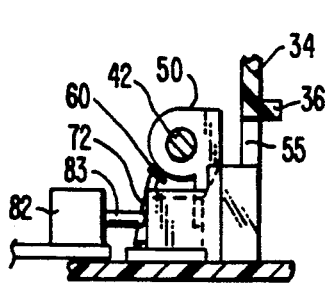
FIGS. 7A-7B are sectional views taken along line 7A—7A of FIG. 6A further illustrating the unlatching operation.
Figure 7B:
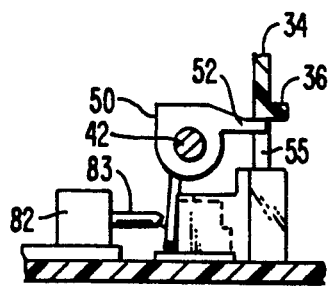

After installation of the drive 20 in the computer base housing 14, it may be powered up and operated under control of the computer system in the usual way. FIGS. 6A and 6B are sequential partial top plan views illustrating the process of removing a disk drive 20. When it is desired to remove the disk drive, shaft 42 is rotated from the home position illustrated in FIG. 4 and 5C by approximately one-quarter turn in the clockwise direction until the abutment edge 114 of catch pawl 112 is engaged with the abutment edge 116 of cogging member 117, which is still in the retracted position illustrated in FIG. 8A. Rotation of shaft 42 positions the angled tooth 110 on catch member 108 in a position to encounter bearing surface 105 (FIG. 11) of pivotable member 90. Also, rotation of shaft 42 causes beak portion 52 of latch retracting member 50 (FIGS. 7A and 7B) to engage surface 70 of latch member 60 (FIG. 12) and retract latch member 60 toward switch 82 a sufficient distance so that abutment edge 63 is disengaged from latching edge 27 on disk drive 20. Thereafter, shaft 42 is translated inwardly by manually applying inward pressure on knob 41. Inward movement of shaft 42 causes angled tooth 110 to rotate pivotable member 90 clockwise until locking edge 95 disengages from locking edge 28 formed in disk drive 20. In addition, pivotable ejector member 135 is rotated clockwise to force drive 20 partially out of the computer based housing 14. The extent of the outward movement of disk drive 20 is such that the exposed portion of the drive can be grasped by the user and completely removed from the housing at this point. As the shaft 42 is translated inwardly of the computer base housing 14 (to the left as viewed in FIGS. 6A and 6B), the catch pawl 112 clears the abutment surface 116 of cogging member 117, which frees shaft 42 for counter clockwise rotation and translation to the right under the action of spring 46 to the home position illustrated in FIGS. 4, 7B and 8B. As best seen in FIG. 7B, when in the home position beak 52 of latch retracting member 50 abuts the edge 55 of wall 34 preventing inward movement of shaft 42. The invention is now ready for subsequent insertion of a disk drive 20.

Figure 14:
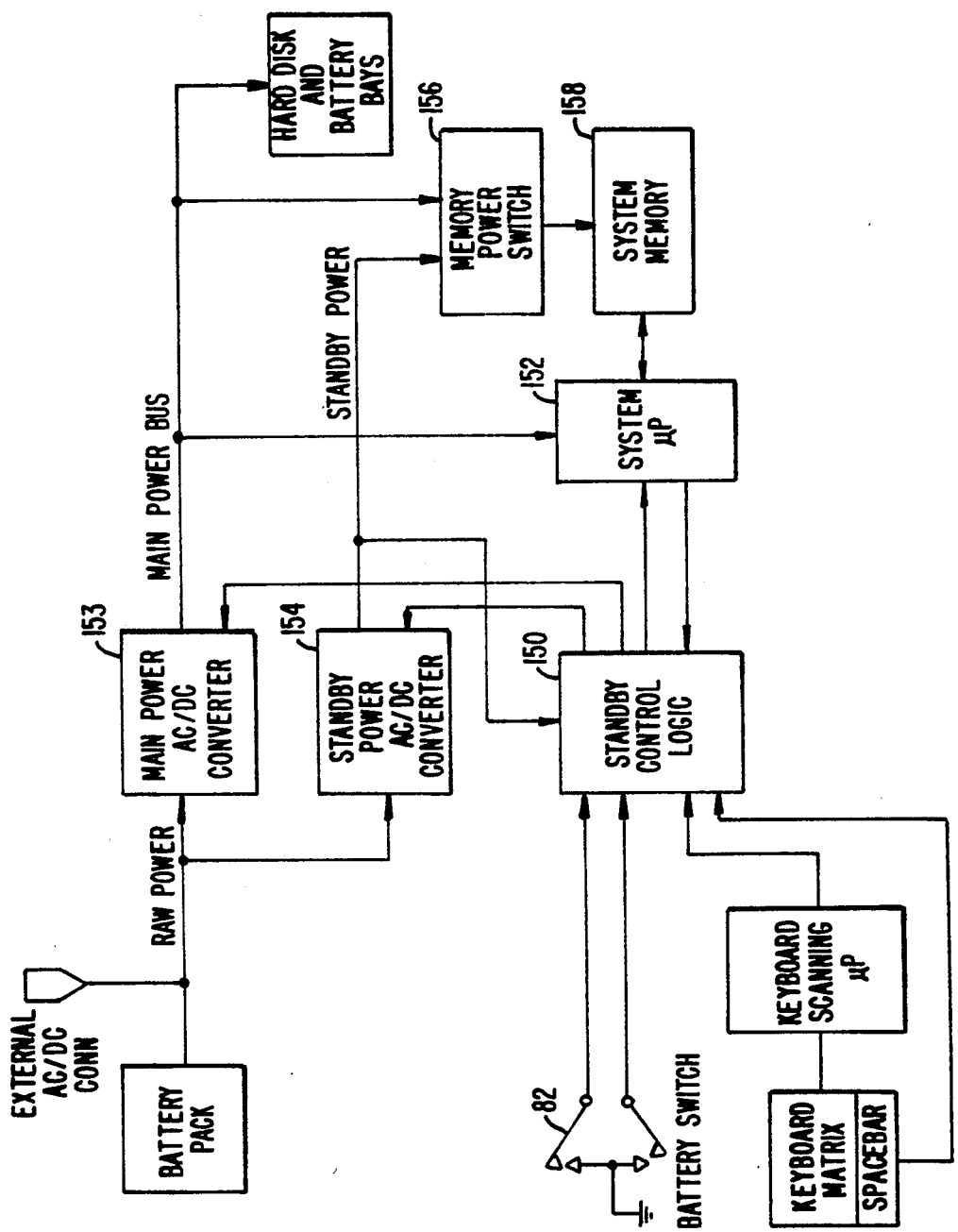
FIG. 14 is a block diagram illustrating the interaction between the disk drive switch and portions of the computer system.

With reference to FIG. 14, switch 82 is coupled to a standby control logic block 150. When logic block 150 receives an actuation signal from switch 82, a control signal is issued to the system microprocessor 152, the main power DC to DC converter 153 and the standby power DC to DC converter 154. Upon receiving a control signal from logic block 150, the system microprocessor begins a suitable power down routine which is more fully described in commonly assigned co-pending U.S. patent application Ser. No. 414,203, filed Sep. 28, 1989, entitled "Low Power Standby Mode", the disclosure of which is hereby incorporated by reference, which saves various data values. Standby power is applied via memory power switch 156 to the system memory 158.

When the switch 82 returns to the normal state (e.g., after complete insertion of the disk drive 20 into the computer base housing 14 and mating of the plug 30 and socket 38), the standby control logic block 150 issues another control signal indicating that the standby state is no longer required. In response to this control signal, main power is reapplied from converter 153 to the various units shown and the system microprocessor 152 returns to the active state. When the drive ejection sequence illustrated in FIGS. 6A and 6B begins, switch 82 generates a standby initiation signal and the system responds in the manner described above.

As will now be apparent, the invention affords reliable latching, locking and ejecting for a portable disk drive in the extremely confined environment of a portable computer. In addition, any static charges present on the disk drive 20 are directed toward ground prior to the electrical interconnection between the disk drive and the computer system by means of the positioning of the grounding contacts 32, 39. In addition, the single switch 82 permits the computer system to enter the standby mode prior to the electrical interconnection or disconnection between the drive 20 and the computer system. Lastly, the mechanical functions are all performed with relatively simple elements, which are inexpensive to fabricate and assemble and are highly reliable in operation.

While the above provides a full and complete disclosure of the preferred embodiments of the invention, various modifications, alternate constructions and equivalents will occur to those skilled in the art. For example, other spring biasing arrangements than those specifically illustrated may be employed to urge the biased elements toward their normal position. Therefore, the above description should not be construed as limiting the scope of the invention, which is defined by the appended claims.

What is claimed is:

1. In a portable computer having a housing, a removable disk drive receiver comprising:
    guide means in the housing for supporting a removable disk drive;
    latch means in the housing adjacent the guide means and engageable by a removable disk drive for retaining a removable disk drive after insertion of the drive into the guide means;
    control means in the housing adjacent the latch means and engageable therewith for retracting said latch means to enable removal of the disk drive from the guide means; and
    switch means coupled to said latch means for generating a standby signal in response to movement of the latch means caused by the insertion of a removable disk drive into the guide means or the retraction of the latch means by the control means so that the portable computer can assume a standby mode in response to the standby signal.

2. The invention of claim 1 wherein said guide means includes a pair of laterally spaced parallel rails, each rail being dimensioned to slidably receive a grooved wall portion of the disk drive.

3. The invention of claim 1 wherein said latch means includes a latch member having a nose engageable with a latching edge formed in the disk drive, a bearing portion and a biasing member coupled to said bearing portion for urging said latch member in a latching direction so that the nose of said latch member is biased against the disk drive latching edge when the drive is installed in the computer.

4. The invention of claim 1 where in said control means includes a shaft rotatably mounted adjacent said guide means, said latch means and said switch means; and
    a latch retracting member coupled to said shaft and engageable with said latch means when said shaft is rotated to a predetermined unlatch position to disengage said latch means from the disk drive thereby enabling removal of the drive from the computer.

5. The invention of claim 4 wherein said shaft is reciprocably mounted for bi-directional movement along the longitudinal axis thereof; and
    wherein said control means further includes means for biasing said shaft in one axial direction.

6. The invention of claim 5 wherein said axial direction is outwardly of the computer.

7. The invention of claim 6 wherein said control means further includes means for applying an ejection force to the drive when said shaft is translated along the axis thereof inwardly of the computer.

8. The invention of claim 7 wherein said ejection force applying means includes a pivotable member having a first portion engageable with said shaft and a second portion engageable with the drive.

9. The invention of claim 8 wherein said first and second engageable portions are positioned on opposite sides of the pivot axis of said pivotable member.

10. The invention of claim 5 further including means for preventing movement of said shaft in the axial direction opposite said one axial direction when the shaft is angularly located in a position different from the unlatch position.

11. The invention of claim 10 wherein said movement preventing means includes an abutment edge engageable with said latch retracting member.

12. The invention of claim 5 wherein said control means further includes angular bias means for biasing said shaft in a predetermined angular direction; and releasable catch means for preventing rotational movement of said shaft in said predetermined angular direction after said shaft has been rotated in the opposite direction by a predetermined amount.

13. The invention of claim 12 wherein said releaseable catch means includes a catch member coupled to said shaft and having a catch pawl extending radially outwardly of the shaft axis, and a cogging member positioned adjacent said catch member in an interfering location so that said catch pawl engages said cogging member upon rotation of said shaft in the opposite direction by said predetermined amount.

14. The invention of claim 13 wherein said cogging member is positioned adjacent said catch member for limited movement in directions perpendicular and parallel to said shaft.

15. The invention of claim 1 further including releasable locking means for additionally retaining the drive in the computer.

16. The invention of claim 15 wherein said releasable locking means includes a pivotable member having a locking portion engageable with a lock edge formed in the drive, means for biasing the locking portion in the direction of the lock edge in the drive, and means for enabling said locking portion to be retracted from the lock edge of the drive to enable removal thereof.

17. The invention of claim 1 further including connector means for enabling electrical interconnection between the computer and the drive when received in the guide means, and electrical grounding means engageable with an associated electrical grounding means carried by the drive for enabling static electrical discharge of the drive upon insertion into the computer and before electrical connection occurs between the drive and the computer.

18. In a portable computer having a standby power mode of operation and a receiver for a removable disk drive electrically connectable to the computer, the improvement comprising latch means for retaining the disk drive connected to the computer, latch release means for retracting the latch means to enable disconnection of the disk drive from the computer, and means responsive to motion of a drive in the receiver in the insertion direction or motion of the latch release means prior to movement of the drive in the removal direction for generating a standby power mode initiation signal so that the computer operates in the standby power mode prior to the electrical connection of the drive to the computer and prior to the electrical disconnection of the drive from the computer.

19. The invention of claim 18 wherein the portable computer and the disk drive are provided with complementary interface connectors, and wherein the improvement further comprises grounding means electrically coupled to the computer and engageable with an associated electrical grounding means carried by the disk drive for providing a static discharge path from the drive via the grounding means prior to electrical connection between the drive and the computer by means of the complementary interface connectors.

20. The invention of claim 18 wherein said signal generating means include an electromechanical switch engageable with the disk drive during insertion or removal.

* * * * *

UNITED STATES PATENT AND TRADEMARK OFFICE
CERTIFICATE OF CORRECTION

PATENT NO. :     5,305,180
DATED       :     April 19, 1994
INVENTOR(S) :    Mitchell, et al.

It is certified that error appears in the above-identified patent and that said Letters Patent is hereby corrected as shown below:

On title page, item [73] delete
    the name of the Assignee "GRiD Systems Corporation" and insert
    therefor —AST RESEARCH, INC.—.

Signed and Sealed this

Sixth Day of September, 1994

Attest:

BRUCE LEHMAN

Attesting Officer                Commissioner of Patents and Trademarks